US012646762B2

(12) United States Patent
Lee

(10) Patent No.: US 12,646,762 B2
(45) Date of Patent: Jun. 2, 2026

(54) BATTERY MODULE, BATTERY PACK, AND ELECTRIC VEHICLE

(71) Applicant: LG ENERGY SOLUTION, LTD., Seoul (KR)

(72) Inventor: Chang-Hui Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 599 days.

(21) Appl. No.: 17/928,861

(22) PCT Filed: Oct. 12, 2021

(86) PCT No.: PCT/KR2021/014054
§ 371 (c)(1),
(2) Date: Nov. 30, 2022

(87) PCT Pub. No.: WO2022/080838
PCT Pub. Date: Apr. 21, 2022

(65) Prior Publication Data
US 2023/0187718 A1     Jun. 15, 2023

(30) Foreign Application Priority Data

Oct. 12, 2020    (KR) ........................ 10-2020-0131386

(51) Int. Cl.
*H01M 10/00*        (2006.01)
*H01M 10/48*        (2006.01)
(Continued)

(52) U.S. Cl.
CPC ......... *H01M 10/482* (2013.01); *H01M 10/48* (2013.01); *H01M 50/213* (2021.01); *H01M 50/271* (2021.01)

(58) Field of Classification Search
CPC .. H01M 10/482; H01M 10/48; H01M 50/213; H01M 50/271
See application file for complete search history.

(56) References Cited

U.S. PATENT DOCUMENTS 7,545,119 B1 * 6/2009 Egan .................... H02J 7/00308
320/136
2011/0129705 A1      6/2011 Lee
(Continued)

FOREIGN PATENT DOCUMENTS

CN        202585672 U     12/2012
CN        109411841 A      3/2019
(Continued)

OTHER PUBLICATIONS

Office Action issued Dec. 11, 2023 for Japanese Patent Application No. 2022-567675.
(Continued)

*Primary Examiner* — Nicholas P D'Aniello
(74) *Attorney, Agent, or Firm* — Morgan, Lewis & Bockius LLP

(57)            ABSTRACT

A battery module according to the present invention includes a plurality of battery cells, a module case including an upper frame above the plurality of battery cells and having a plurality of flow holes, a lower frame below the upper frame and including an accommodating space for accommodating at least a portion of each of the plurality of battery cells, and an upper cover between the upper frame and the lower frame, above the plurality of battery cells, and including a plurality of openings to expose electrode terminals of the plurality of battery cells, a piezoelectric sensor film between the upper frame and the upper cover or outside the upper frame, and configured to generate an electrical signal when pressure is applied by an external force, and a control unit configured to receive the electrical signal generated from the piezoelectric sensor film and analyze whether the battery cells have exploded.

16 Claims, 5 Drawing Sheets

(51) Int. Cl.
  *H01M 50/213* (2021.01)
  *H01M 50/271* (2021.01)

(56) References Cited

U.S. PATENT DOCUMENTS

| | | | |
|---|---|---|---|
| 2012/0148890 A1 | 6/2012 | Goto et al. | |
| 2013/0093383 A1 | 4/2013 | Kim et al. | |
| 2015/0210182 A1 | 7/2015 | Phlegm et al. | |
| 2020/0161717 A1* | 5/2020 | Fritz | H01M 10/613 |
| 2021/0197691 A1 | 7/2021 | Stefanopoulou et al. | |
| 2022/0021071 A1 | 1/2022 | Shimizu et al. | |

FOREIGN PATENT DOCUMENTS

| | | | |
|---|---|---|---|
| CN | 210576306 U | 5/2020 |
| CN | 111697183 A | 9/2020 |
| DE | 10 2012 001594 A1 | 8/2013 |
| DE | 10 2012 203 456 A1 | 9/2013 |
| JP | 2001-056259 A | 2/2001 |
| JP | 2009-231060 A | 10/2009 |
| JP | 2010-45001 A | 2/2010 |
| JP | 2012-15121 A | 1/2012 |
| JP | 2012-74198 A | 4/2012 |
| JP | 2017-027774 A | 2/2017 |
| KR | 10-2011-0060166 A | 6/2011 |
| KR | 10-2012-0048441 A | 5/2012 |
| KR | 10-2013-0037863 A | 4/2013 |
| KR | 10-2013-0078953 A | 7/2013 |
| KR | 10-1334534 B1 | 12/2013 |
| KR | 10-2017-0084789 A | 7/2017 |
| KR | 10-2018-0099668 A | 9/2018 |
| KR | 10-2019-0114180 A | 10/2019 |
| KR | 10-2034771 B1 | 10/2019 |
| KR | 10-2020-0056715 A | 5/2020 |
| KR | 10-2020-0084403 A | 7/2020 |
| WO | 2020/116089 A1 | 6/2020 |

OTHER PUBLICATIONS

International Search Report (with partial translation) and Written Opinion dated Jan. 27, 2022, for corresponding International Patent Application No. PCT/KR2021/014054.
The extended European Search Report, dated Jul. 8, 2024, issued in corresponding EP Patent Application No. 21880485.4.
Li Changfeng et al., "518 Questions on Automotive Electrical Maintenance", Mechanical Industry Press, Nov. 30, 2013, pp. 46 and 47.
Office Action dated Apr. 11, 2025 issued in corresponding Chinese Patent Application No. 202180035015.X. (Note: CN 111697183 A cited in this CN Office Action has already been cited in a prior IDS.).

* cited by examiner

BATTERY MODULE, BATTERY PACK, AND ELECTRIC VEHICLE

TECHNICAL FIELD

The present disclosure relates to a battery module, a battery pack, and an electric vehicle, and more particularly, to a battery module capable of rapidly detecting explosion of a battery cell.

The present application claims priority to Korean Patent Application No. 10-2020-0131386 filed on Oct. 12, 2020 in the Republic of Korea, the disclosures of which are incorporated herein by reference.

BACKGROUND ART

In recent years, as demand for portable electronic products such as laptops, video cameras, and portable phones has rapidly increased, and the development of electric vehicles, energy storage batteries, robots, satellites, etc. is in full swing, research on repetitive chargeable/dischargeable high-performance secondary batteries is being actively conducted.

Currently commercialized secondary batteries include nickel-cadmium batteries, nickel-hydrogen batteries, nickel-zinc batteries, and lithium secondary batteries, and among them, lithium secondary batteries have almost no memory effect compared to nickel-based secondary batteries, and thus, are in the spotlight for their advantages of being free to charge and discharge, extremely low self-discharge rate, and high energy density.

These lithium secondary batteries mainly use a lithium-based oxide and a carbon material as a positive electrode active material and a negative electrode active material, respectively. Also, these lithium secondary batteries include an electrode assembly in which a positive electrode plate and a negative electrode plate to which a positive electrode active material and a negative electrode active material are applied, respectively, are arranged with a separator therebetween, and an exterior, that is, a battery case, for sealing and storing the electrode assembly together with an electrolyte.

In addition, according to the shape of the exterior, lithium secondary batteries may be classified into can-type secondary batteries in which an electrode assembly is embedded in a metal can and pouch-type secondary batteries in which an electrode assembly is embedded in a pouch of an aluminum laminate sheet.

Among them, in can-type secondary batteries, a metal can in which an electrode assembly is embedded may be manufactured in a cylindrical shape. Battery modules of the related art may include a bus bar configured to electrically connect a plurality of can-type secondary batteries to a module case for accommodating a plurality of secondary batteries.

Also, in order to manufacture battery packs in the related art, the plurality of secondary batteries are primarily accommodated in the module case to manufacture a battery module, and a plurality of battery modules thus manufactured are mounted on a tray.

Recently, demand for products requiring large-capacity power storage, such as electric vehicles and power storage devices, is increasing. In particular, when a battery pack is configured using a cylindrical battery cell, a large number of battery cells are stored in a limited internal space of a battery module, and as compared to a battery module including a small number of cylindrical battery cells, the battery module including the plurality of battery cells may generate a larger explosion in case of an accident and may have a higher probability of explosion.

Furthermore, in the related art, because the abnormality of battery modules has been determined by measuring the temperature inside a module case, even when some of a large number of cylindrical battery cells inside a battery module explode, in a case where exploded cylindrical battery cells are distant from a temperature sensor, whether an explosion has occurred is not detectable, or it takes much time to detect an increase in temperature and determine whether an explosion has occurred. Accordingly, in case of explosion of battery modules, the fire may not be rapidly suppressed, thereby spreading into a bigger fire.

DISCLOSURE

Technical Problem

The present disclosure is designed to solve the problems of the related art, and therefore the present disclosure is directed to providing a battery module capable of rapidly detecting explosion of a battery cell.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A battery module according to the present disclosure for achieving the object includes:

a plurality of battery cells;

a module case including an upper frame located above the plurality of battery cells and in which a plurality of flow holes are formed, a lower frame located below the upper frame and including an accommodating space for accommodating at least a portion of each of the plurality of battery cells, and an upper cover located between the upper frame and the lower frame, located above the plurality of battery cells, and including a plurality of openings configured to expose electrode terminals of the plurality of battery cells;

a piezoelectric sensor film located between the upper frame and the upper cover or located outside the upper frame, and configured to generate an electrical signal when pressure is applied by an external force; and a control unit configured to receive the electrical signal generated from the piezoelectric sensor film and analyze whether the battery cells explode.

Also, the upper cover may include a partition wall extending to surround the plurality of openings and protruding upward.

Furthermore, the piezoelectric sensor film may be mounted on the partition wall.

In addition, the piezoelectric sensor film may be accommodated in a space surrounded by the partition wall, and the partition wall may include a slit configured such that an outer peripheral portion of the piezoelectric sensor film is inserted.

Also, the piezoelectric sensor film may include:

a plurality of sensing units located to respectively face the plurality of openings formed in the upper cover; and a connection portion configured to connect between the plurality of sensing units.

Furthermore, the piezoelectric sensor film may include a cut portion linearly cut in a portion corresponding to the plurality of flow holes.

In addition, the piezoelectric sensor film may include a bending portion configured such that a portion is bendable along a reference line by external pressure.

Also, a battery pack according to the present disclosure for achieving the above object includes at least one battery module.

Furthermore, the battery pack may include a plurality of battery modules, the battery pack may further include a tray configured to mount the plurality of battery modules, the plurality of battery modules may be mounted on the tray, and the piezoelectric sensor film may be configured to cover upper portions of the plurality of battery modules.

Also, an electric vehicle according to the present disclosure for achieving the above object includes at least one battery module.

Advantageous Effects

According to an aspect of the present disclosure, the present disclosure includes a piezoelectric sensor film between an upper frame and an upper cover, and thus, when at least some of a plurality of battery cells explode, an electrical signal of the piezoelectric sensor film is generated by an explosion pressure, and whether battery cells have exploded may be determined by a control unit. Accordingly, whether the plurality of battery cells have exploded may be rapidly detected, as compared to the technology represented in the related art in which only the temperature of some battery cells is measured. Furthermore, the present disclosure may solve a disadvantage of, by checking only the temperature of some battery cells represented in the related art, not detecting an explosion of battery cells located in a place distant from a temperature sensor.

BRIEF DESCRIPTION OF DRAWINGS

The accompanying drawings illustrate preferred embodiments of the present disclosure and together with the foregoing disclosure, serve to provide further understanding of the technical features of the present disclosure, and thus, the present disclosure is not construed as being limited to the drawing.

FIG. 2 is an exploded perspective view schematically showing configurations of a battery module according to an embodiment of the present disclosure.

FIG. 7 is a perspective view schematically showing a battery pack according to an embodiment of the present disclosure.

MODES FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but should be interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
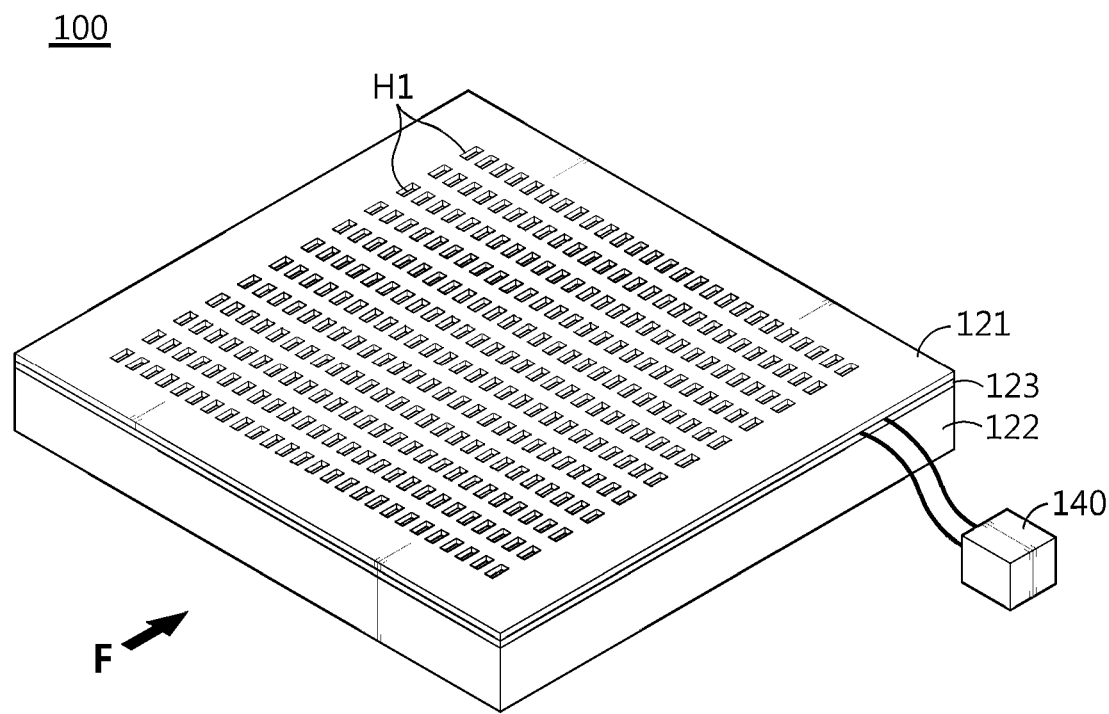
FIG. 1 is a perspective view schematically showing a battery module according to an embodiment of the present disclosure.

FIG. 1 is a perspective view schematically showing a battery module according to an embodiment of the present disclosure. Also, FIG. 2 is an exploded perspective view schematically showing configurations of a battery module according to an embodiment of the present disclosure.

Figure 2:
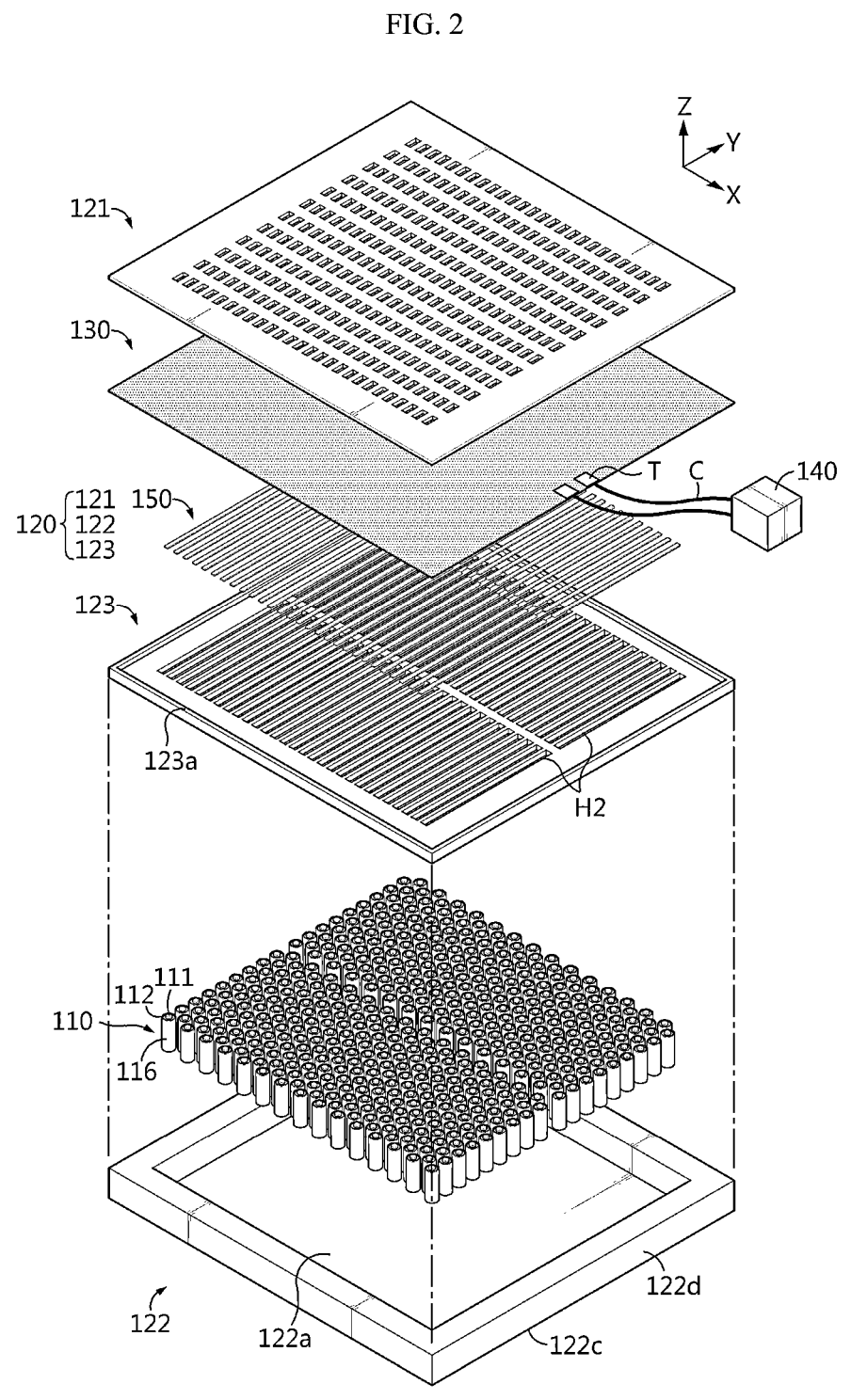

Referring to FIGS. 1 and 2, a battery module 100 according to an embodiment of the present disclosure includes a plurality of battery cells 110, a module case 120, a piezoelectric sensor film 130, and a control unit 140.

Specifically, each of the battery cells 110 may be a cylindrical battery cell 110. The cylindrical battery cell 110 may have a shape that is elongated in upward and downward directions. Electrode terminals 111 and 112 may be provided on an upper portion of the cylindrical battery cell 110. The cylindrical battery cell 110 may include a battery can 116, the negative electrode terminal 112 formed on a body of the battery can 116, and the positive electrode terminal 111 formed on a battery cap coupled to an upper portion of the battery can 116. An electrode assembly (not shown) accommodated in the battery can 116 may be included. Because the configuration of the cylindrical battery cell 110 is widely known to those skilled in the art at the time of filing the present disclosure, a more detailed description will be omitted in the present specification.

Furthermore, the plurality of battery cells 110 may be arranged in at least one direction. The plurality of cylindrical battery cells 110 may be arranged spaced apart by a predetermined distance. For example, as shown in FIG. 2, the plurality of battery cells 110 may be arranged in forward and backward directions (Y-axis direction) and left and right directions (X-axis direction). Also, a plurality of cylindrical battery cells 110 located in one column and a plurality of cylindrical battery cells 110 located in another column may be arranged so that locations of left and right directions are different. That is, it may be seen that the plurality of cylindrical battery cells 110 are overall arranged to front, back, left, and right in a zigzag manner.

In addition, the plurality of battery cells 110 may be electrically connected through a bus bar 150. The bus bar 150 may include an electrically conductive metal. The bus bar 150 may include, for example, a metal such as aluminum, nickel, or copper. The bus bar 150 may be mounted on an upper cover 123. That is, the bus bar 150 may be located at one side of an opening H2 of the upper cover 123. The bus bar 150 may be connected to the positive electrode terminal, the negative electrode terminal, or the positive electrode terminal and the negative electrode terminal of the battery cell 110 through a metal wire (not shown).

Also, the module case 120 may include an upper frame 121, a lower frame 122, and the upper cover 123. The upper frame 121 may be located above the plurality of battery cells 110. The upper frame 121 may include a plurality of flow holes H1 configured to allow internal air and external air of the module case 120 to flow with each other. The upper frame 121 may have a plate shape extending in a horizontal direction.

Furthermore, the lower frame 122 may be located below the upper frame 121. The lower frame 122 may include an accommodating space 122a for accommodating at least a portion of each of the plurality of battery cells 110. For example, as shown in FIG. 2, the lower frame 122 may include a side wall 122d extending to surround the plurality of battery cells 110 and a lower plate 122c connected to a lower portion of the side wall 122d. The side wall may form a space 122a in which the plurality of battery cells 110 may be accommodated.

In addition, the upper cover 123 may be located between the upper frame 121 and the lower frame 122. The upper cover 123 may have a plate shape extending in the horizontal direction. The upper cover 123 may be located above the plurality of battery cells 110. The upper cover 123 may include a plurality of openings H2 by which the electrode terminals 111 and 112 of each of the plurality of battery cells 110 may be exposed to the outside.

Furthermore, the piezoelectric sensor film 130 may be located between the upper frame 121 and the upper cover 123. The piezoelectric sensor film 130 may have an outer periphery interposed between a lower surface of the upper frame 121 and an upper surface of the upper cover 123.

Also, the piezoelectric sensor film 130 may be configured to generate a voltage according to displacement or deformation of a piezoelectric crystal by pressure or torsion of the film. That is, the piezoelectric sensor film 130 may include a piezoelectric crystal. The piezoelectric crystal may be, for example, quartz, Rochelle salt, barium titanate, or the like. The piezoelectric sensor film 130 may include, for example, a polyester material. The piezoelectric sensor film 130 may include at least two terminal ports T. The piezoelectric sensor film 130 may transmit an electrical signal to the control unit 140 through a coil C connected to the terminal port T when a voltage is generated by pressure or torsion.

Furthermore, the control unit 140 may be configured to receive the electrical signal generated from the piezoelectric sensor film 130 and analyze whether the battery cells 110 have exploded. For example, the control unit 140 may be configured to determine that at least some of the plurality of battery cells 110 have exploded when an electrical signal of a predetermined voltage or higher is received from the piezoelectric sensor film 130.

Therefore, according to this configuration of the present disclosure, the present disclosure includes the piezoelectric sensor film 130 between the upper frame 121 and the upper cover 123, and thus, when an explosion occurs in at least some of the plurality of battery cells 110, an electrical signal of the piezoelectric sensor film 130 is generated by an explosion pressure, such that whether the battery cells 110 have exploded may be determined by the control unit 140. Accordingly, whether the plurality of battery cells 110 have exploded may be rapidly detected, as compared to the technology represented in the related art in which only the temperature of some battery cells 110 is measured. Furthermore, the present disclosure may solve a disadvantage of, by checking only the temperature of some battery cells 110 represented in the related art, not detecting an explosion of battery cells 110 located in a place distant from a temperature sensor.

Figure 3:
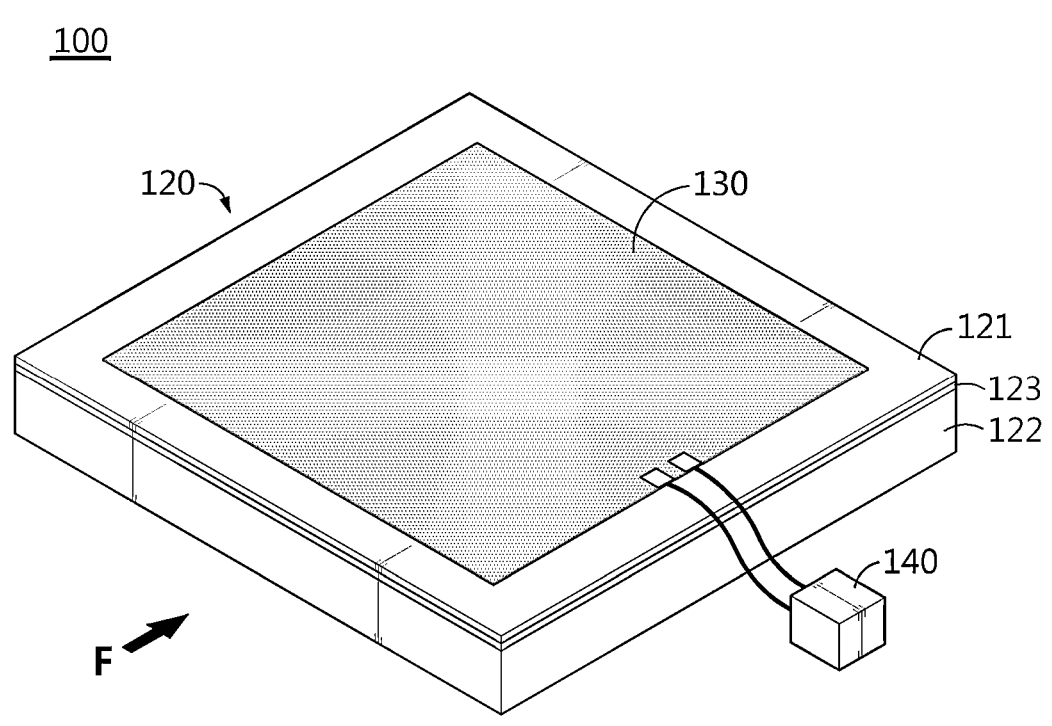
FIG. 3 is a perspective view schematically showing a state of a battery module according to another embodiment of the present disclosure.

FIG. 3 is a perspective view schematically showing a state of a battery module according to another embodiment of the present disclosure.

Referring to FIG. 3, in the battery module 100 according to another embodiment of the present disclosure, the piezoelectric sensor film 130 may be located outside the upper frame 121. For example, the piezoelectric sensor film 130 may have a size corresponding to an upper surface of the upper frame 121. The piezoelectric sensor film 130 may be located to be in close contact with the upper surface of the upper frame 121. The piezoelectric sensor film 130 may be configured to generate an electrical signal by pressure of a gas emitted through the plurality of flow holes H1 when some battery cells 110 of the plurality of battery cells 110 accommodated in the module case 120 explode.

Therefore, according to this configuration of the present disclosure, the present disclosure includes the piezoelectric sensor film 130 located outside the upper frame 121, and thus, when an explosion occurs in at least some of the plurality of battery cells 110, an electrical signal of the piezoelectric sensor film 130 is generated by an explosion pressure, such that whether the battery cells 110 have exploded may be determined by the control unit 140. Accordingly, whether the plurality of battery cells 110 have exploded may be rapidly detected, as compared to the technology in which only the temperature of some battery cells 110 represented in the related art is measured. Furthermore, the present disclosure may solve a problem of, when only the temperature of some battery cells 110 represented in the related art is checked, not detecting thermal runaway or explosion of battery cells 110 located in a place distant from a temperature sensor, or taking much time to detect the same.

Meanwhile, referring back to FIG. 2, the upper cover 123 of the present disclosure may include a partition wall 123a. The partition wall 123a may extend to surround the plurality of openings H2. The partition wall 123a may have a shape extending in the horizontal direction along an outer peripheral portion of the upper cover 123. The partition wall 123a may have a shape protruding upward.

Also, the piezoelectric sensor film 130 may be mounted on the partition wall 123a. That is, when mounted on the partition wall 123a, the piezoelectric sensor film 130 may be spaced apart from the plurality of openings H2 of the upper cover 123 by a predetermined distance in the upward and downward directions.

Therefore, according to this configuration of the present disclosure may secure a space of a predetermined size between the piezoelectric sensor film 130 and the plurality of battery cells 110 by including the partition wall 123a in the upper cover 123, and thus may secure a sufficient free space in which displacement of the piezoelectric sensor film 130 may occur due to an explosion pressure of the battery cells 110. Accordingly, the present disclosure may prevent the piezoelectric sensor film 130 from not detecting an explosion of the battery cells 110.

Figure 4:
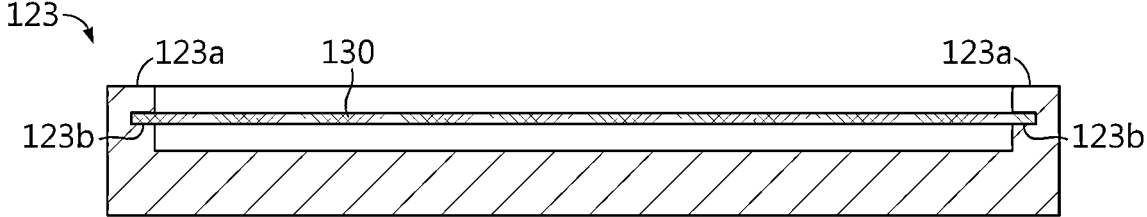
FIG. 4 is a vertical cross-sectional view schematically showing a state of an upper cover and a piezoelectric sensor film of a battery module, according to another embodiment of the present disclosure.

FIG. 4 is a vertical cross-sectional view schematically showing a state of an upper cover and a piezoelectric sensor film of a battery module, according to another embodiment of the present disclosure.

Referring to FIG. 4, the battery module 100 according to another embodiment of the present disclosure may further include a slit 123*b* in the upper cover 123 when compared to the battery module 100 of FIG. 2.

Specifically, in the upper cover 123 of FIG. 4, the slit 123*b* may be formed on an inner surface of the partition wall 123*a* included in the upper cover 123. The slit 123*b* may have a shape extending in a horizontal direction along the inner surface of the partition wall 123*a*. Also, the slit 123*b* may be configured such that an outer peripheral portion of the piezoelectric sensor film 130 is inserted.

Also, the piezoelectric sensor film 130 may be configured to be accommodated in a space surrounded by the partition wall 123*a*. The slit 123*b* may be formed in an inner middle portion of the partition wall 123*a* so that the piezoelectric sensor film 130 may be located at an intermediate height of the space of the partition wall 123*a*.

Therefore, according to this configuration of the present disclosure, the present disclosure includes the slit 123*b* into which the outer peripheral portion of the piezoelectric sensor film 130 is inserted and fixed thereto, the slit 123*b* being formed in the partition wall 123*a*, and thus may stably fix the piezoelectric sensor film 130 and secure a sufficient free space in which displacement of the piezoelectric sensor film 130 may occur due to an explosion pressure of the battery cells 110. Accordingly, the present disclosure may prevent the piezoelectric sensor film 130 from not detecting an explosion of the battery cells 110.

Figure 5:
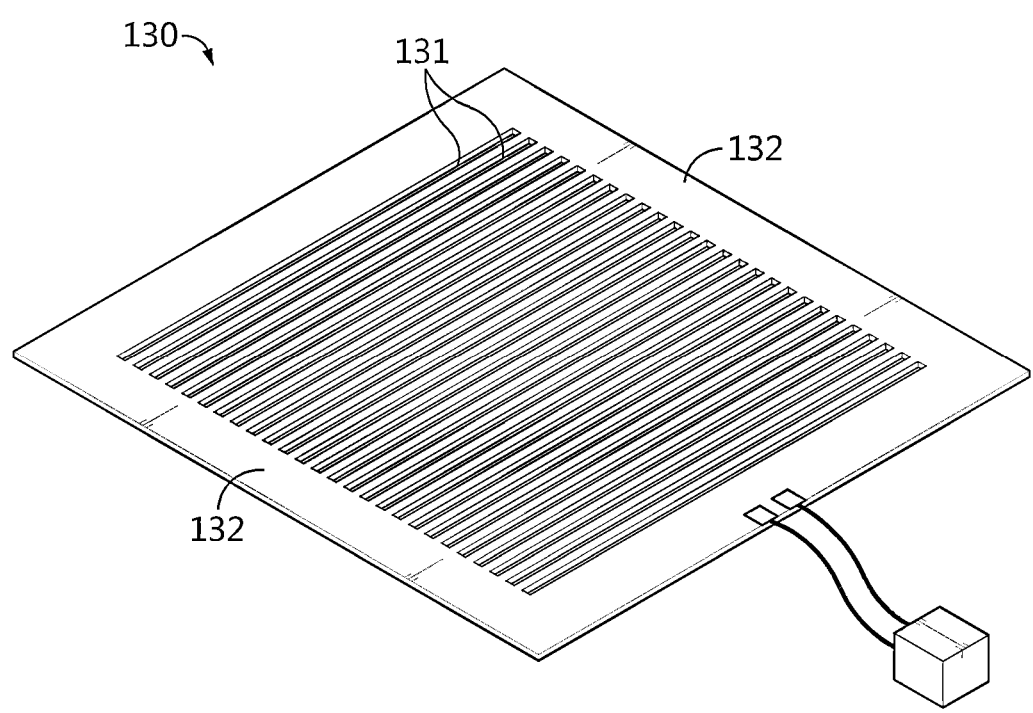
FIG. 5 is a perspective view schematically showing a state of a piezoelectric sensor film of a battery module, according to another embodiment of the present disclosure.

FIG. 5 is a perspective view schematically showing a state of a piezoelectric sensor film of a battery module, according to another embodiment of the present disclosure.

Referring to FIG. 5 together with FIG. 2, the piezoelectric sensor film 130 of the battery module 100 according to another embodiment of the present disclosure may have a shape different from that of the piezoelectric sensor film 130 of FIG. 2. That is, the piezoelectric sensor film 130 of FIG. 2 has a rectangular sheet shape, whereas the piezoelectric sensor film 130 of FIG. 5 may include a plurality of sensing units 131 and a connection portion 132 connecting the plurality of sensing units 131.

Specifically, the plurality of sensing units 131 may be located to respectively face the plurality of openings H2 (see FIG. 2) formed in the upper cover 123. That is, the plurality of sensing units 131 may have a shape corresponding to the plurality of openings H2 of the upper cover 123. The connection portion 132 may be a connection portion connecting between the sensing units 131. For example, as shown in FIG. 5, each of the plurality of sensing units 131 may have a shape extending lengthwise in forward and backward directions along a shape of each of the openings H2 of the upper cover 123. The connection portion 132 may be configured to connect front end portions of the plurality of sensing units 131 and connect rear end portions of the plurality of sensing units 131.

That is, when some of the plurality of battery cells 110 explode, the plurality of sensing units 131 are pressed while a gas is emitted to the outside through the openings H2, and thus, the piezoelectric sensor film 130 may generate an electrical signal, and the electrical signal may be transmitted to the control unit 140 through the connection portion 132.

Therefore, according to this configuration of the present disclosure, the present disclosure includes the plurality of sensing units 131 and the connection portion 132 in the piezoelectric sensor film 130, thereby minimizing a portion of the piezoelectric sensor film 130, which faces a region of the upper cover 123, the region where pressure sensing is unnecessary, that is, the upper surface in which the plurality of openings H2 are not formed, and thus, may minimize occurrence of erroneous sensing due to other external impacts such as collision with the upper cover 123 rather than a pressure caused by an explosion of the plurality of battery cells 110.

Figure 6:
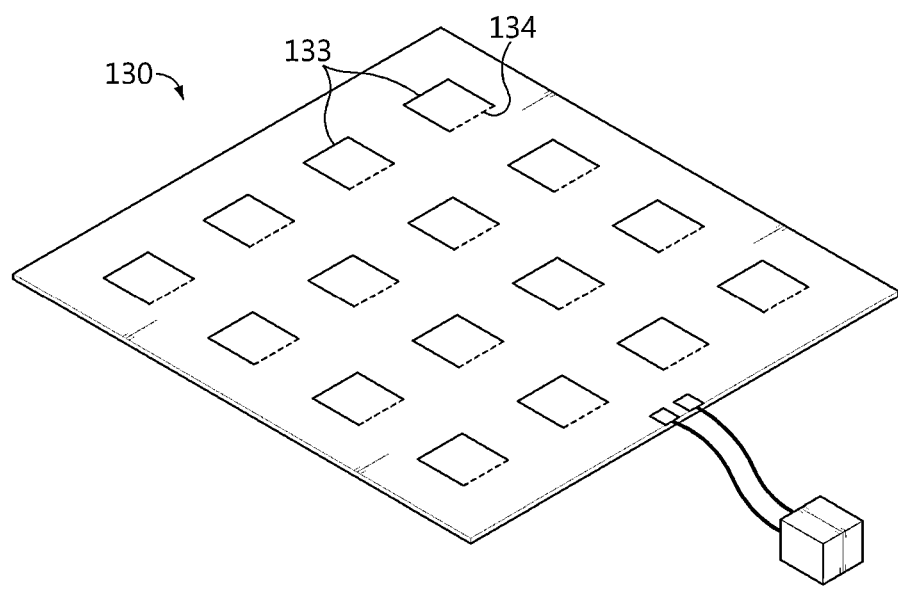
FIG. 6 is a perspective view schematically showing a state of a piezoelectric sensor film of a battery module, according to another embodiment of the present disclosure.

FIG. 6 is a perspective view schematically showing a state of a piezoelectric sensor film of a battery module, according to another embodiment of the present disclosure.

Referring to FIG. 6, the piezoelectric sensor film 130 may further include a cut portion 133 when compared to the piezoelectric sensor film 130 of FIG. 2.

Specifically, the piezoelectric sensor film 130 of FIG. 6 may include the cut portion 133 in a portion corresponding to the plurality of flow holes H1. The cut portion 133 may be formed by linearly cutting a portion of the piezoelectric sensor film 130. That is, the cut portion 133 may be configured such that a portion of the piezoelectric sensor film 130 is cut and easily bent by an external pressure. For example, the cut portion 133 may be formed by cutting in a left direction, then cutting in a backward direction, and then cutting in a right direction. That is, the cut portion 133 may be, for example, when viewed from the front, cut in a "C" shape on a plane. When a battery cell 110 located below the cut portion 133 explodes, the cut portion 133 may be bent in an upward direction by a gas moving in the upward diction. In this case, an electrical signal may be generated from the bent cut portion 133.

Also, the piezoelectric sensor film 130 may include a bending portion 134 configured such that a portion may be bent along a reference line by an external pressure. For example, the bending portion 134 may be configured such that a portion of the piezoelectric sensor film 130 is pre-bent and easily bent by an external pressure. For example, as shown in FIG. 6, the bending portion 134 may be formed by pre-bending a portion of the cut portion 133. That is, the bending portion 134 may be formed by pre-bending an uncut portion of the cut portion 133.

Therefore, according to this configuration of the present disclosure, the present disclosure includes the cut portion 133 and the bending portion 134, and thus, when at least some of the plurality of battery cells 110 explode, the cut portion 133 of the piezoelectric sensor film 130 may be easily bent with a large displacement by an explosion pressure, thereby generating an electrical signal of a higher voltage. Accordingly, the present disclosure may detect more clearly through the piezoelectric sensor film 130 whether the battery cells 110 have exploded.

Figure 7:
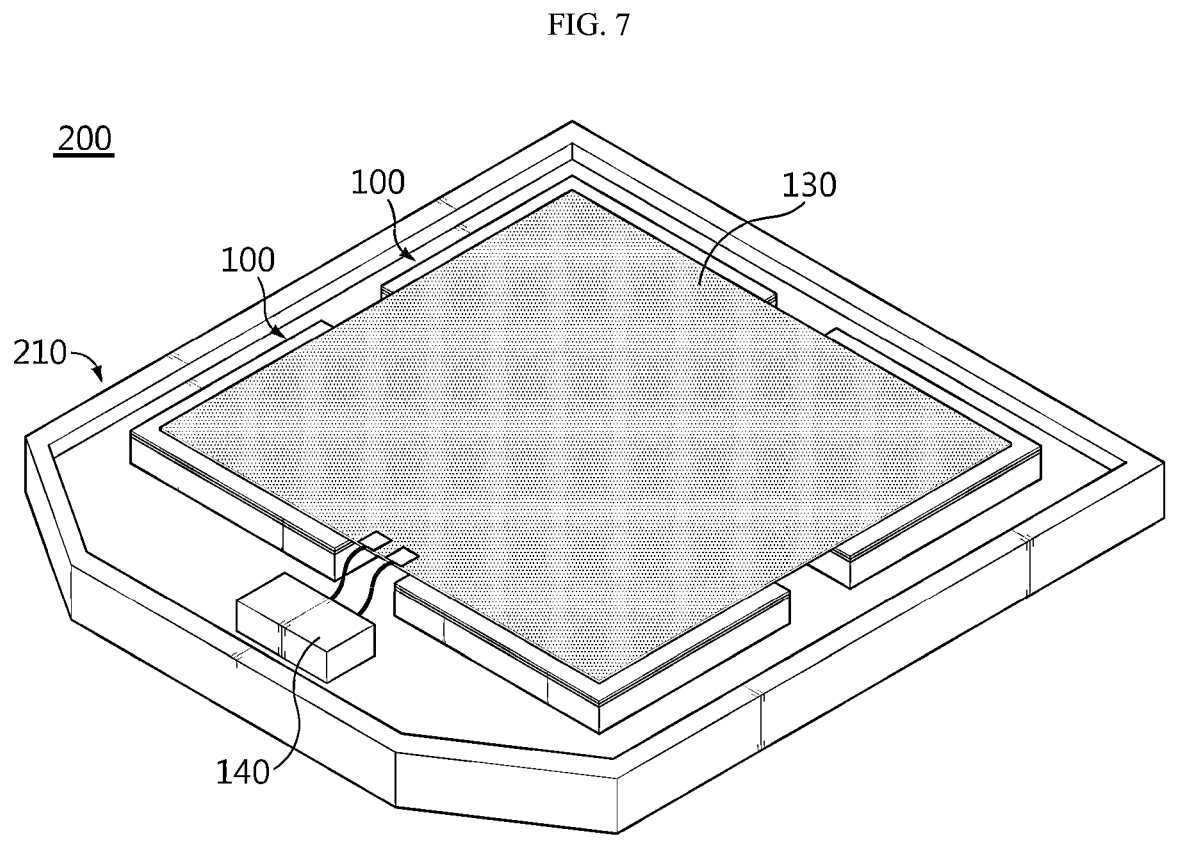

FIG. 7 is a perspective view schematically showing a battery pack according to an embodiment of the present disclosure.

Referring to FIG. 7, a battery pack 200 according to an embodiment of the present disclosure includes at least one battery module 100. The battery pack 200 may include a tray 210 configured to mount the battery module 100. In this case, as shown in FIG. 7, four battery modules 100 may be mounted on the tray.

Also, in the battery pack 200, the piezoelectric sensor film 130 may be mounted on the plurality of battery modules 100 to cover upper portions of the plurality of battery modules 100. That is, the piezoelectric sensor film 130 may have an area sufficient to cover the upper portions of the plurality of battery modules 100. The control unit 140 configured to detect whether battery cells have exploded by analyzing an electrical signal transmitted from the piezoelectric sensor film 130 may be mounted in the tray 210. The battery pack 200 may further include various apparatuses (not shown) for controlling charging and discharging of the battery module 100, for example, a battery management system (BMS), a current sensor, a fuse, and the like.

Also, an electric vehicle (not shown) according to an embodiment of the present disclosure includes at least one battery module 100. That is, in the electric vehicle according to an embodiment of the present disclosure, the battery module 100 according to an embodiment of the present disclosure described above may be mounted in a vehicle body.

Meanwhile, although the terms indicating directions such as up, down, left, right, front, and back are used in the present specification, it would be obvious to a person skilled in the art that the terms are only for convenience of description and may vary depending on the position of an object or the position of an observer.

As described above, although the present disclosure has been described with reference to limited embodiments and drawings, the present disclosure is not limited thereto, and various modifications and variations are possible within the technical idea of the present disclosure and the scope of equivalents of the claims to be described below by those of ordinary skill in the art to which the present disclosure pertains.

EXPLANATION OF NUMERAL REFERENCES

100: Battery module; 110: Battery cell
120: Module case; H1, H2: Flow hole, Opening
121, 122, 123: Upper frame, Lower frame, Upper cover
130: Piezoelectric sensor film; 140: Control unit
123a: Partition wall; 123b: Slit
150: Bus bar; 131, 132: Sensing unit, Connection portion
133: Cut portion; 134: Bending portion
200: Battery pack

What is claimed is:

1. A battery module, comprising:
a plurality of battery cells;
a module case including:
  an upper frame located above the plurality of battery cells and in which a plurality of flow holes are formed,
  a lower frame located below the upper frame and including an accommodating space for accommodating at least a portion of each of the plurality of battery cells, and
  an upper cover located between the upper frame and the lower frame, located above the plurality of battery cells, and including a plurality of openings configured to expose electrode terminals of the plurality of battery cells;
a piezoelectric sensor film located between the upper frame and the upper cover or located above the upper frame, and configured to generate an electrical signal when pressure is applied by an external force; and
a controller configured to receive the electrical signal generated from the piezoelectric sensor film and to determine whether any of the plurality of battery cells have exploded,
wherein the upper cover includes a partition wall protruding upward from an upper surface of the upper cover and extending along an outer peripheral portion of the upper cover to surround the plurality of openings, wherein the piezoelectric sensor film has a size corresponding to an upper surface of the upper frame..

2. The battery module of claim 1, wherein the piezoelectric sensor film is mounted on the partition wall and is spaced part from the plurality of openings of the upper cover by a predetermined distance in a vertical direction.

3. The battery module of claim 2, wherein:
the piezoelectric sensor film is accommodated in a space surrounded by the partition wall, and
the partition wall includes a slit into which an outer peripheral portion of the piezoelectric sensor film is inserted.

4. The battery module of claim 1, wherein the piezoelectric sensor film comprises:
a plurality of sensors located to respectively face the plurality of openings formed in the upper cover; and
a connection portion connected between the plurality of sensors.

5. The battery module of claim 1, wherein the piezoelectric sensor film includes a cut portion linearly cut around a portion of the piezoelectric sensor film corresponding to one or more of the plurality of flow holes.

6. The battery module of claim 5, wherein the piezoelectric sensor film further includes a bending portion configured such that the portion of the piezoelectric sensor film is bendable along the bending portion by external pressure.

7. A battery pack comprising at least one battery module according to claim 1.

8. A battery pack, comprising:
a plurality of battery modules according to claim 1; and
a tray configured to mount the plurality of battery modules,
wherein the plurality of battery modules are mounted on the tray, and
wherein the piezoelectric sensor film is configured to cover upper portions of the plurality of battery modules.

9. An electric vehicle comprising at least one battery module according to claim 1.

10. The battery module of claim 1, wherein the piezoelectric sensor film covers the plurality of openings of the upper cover.

11. The battery module of claim 1, wherein the piezoelectric sensor film overlaps the plurality of flow holes of the upper frame.

12. The battery module of claim 1, wherein the piezoelectric sensor film includes a piezoelectric crystal and is configured to generate the electrical signal based on a displacement or deformation of the piezoelectric crystal by the pressure applied by the external force.

13. The battery module of claim 1, wherein the piezoelectric sensor film includes at least two terminal ports electrically connected to the controller.

14. The battery module of claim 1, wherein the piezoelectric sensor film has an outer edge extending along an outer edge of the upper frame at four sides.

15. The battery module of claim 1, wherein the upper frame has a plate shape and covers the plurality of battery cells.

16. The battery module of claim 1, wherein the upper cover has a plate shape and covers the plurality of battery cells.

\* \* \* \* \*